(12) United States Patent
Huot-Marchand

(10) Patent No.: US 11,543,776 B2
(45) Date of Patent: Jan. 3, 2023

(54) COMPONENT MADE OF MICROMACHINABLE MATERIAL FOR HIGH QUALITY FACTOR RESONATORS

(71) Applicant: ETA SA Manufacture Horlogere Suisse, Grenchen (CH)

(72) Inventor: Sylvain Huot-Marchand, Le Locle (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 651 days.

(21) Appl. No.: 16/575,972

(22) Filed: Sep. 19, 2019

(65) Prior Publication Data

US 2020/0096943 A1    Mar. 26, 2020

(30) Foreign Application Priority Data

Sep. 20, 2018  (EP) .................................... 18195593

(51) Int. Cl.
  *G04B 15/14* (2006.01)
  *C07F 7/08* (2006.01)
  *C07F 7/12* (2006.01)
  *G04B 17/04* (2006.01)

(52) U.S. Cl.
  CPC ............ *G04B 15/14* (2013.01); *C07F 7/0803* (2013.01); *C07F 7/12* (2013.01); *G04B 17/045* (2013.01)

(58) Field of Classification Search
  None
  See application file for complete search history.

(56) References Cited

U.S. PATENT DOCUMENTS

| 6,582,823 | B1 | 6/2003 | Sakhrani et al. |
| 2002/0192472 | A1 | 12/2002 | Metz et al. |
| 2010/0098926 | A1 | 4/2010 | Tosatti et al. |
| 2018/0112144 | A1 | 4/2018 | Rannoux et al. |

FOREIGN PATENT DOCUMENTS

| CN | 103492540 A | 1/2014 |
| CN | 106103615 A | 11/2016 |
| EP | 1 428 667 A3 | 11/2004 |
| EP | 1 927 649 A1 | 6/2008 |

(Continued)

OTHER PUBLICATIONS

Combined Chinese Office Action and Search Report dated Nov. 17, 2020 in Chinese Patent Application No. 201910892726.3 (with English translation of Categories of Cited Documents), citing documents AA, AB and AO-AQ therein, 7 pages.

(Continued)

*Primary Examiner* — Jay Yang
(74) *Attorney, Agent, or Firm* — Oblon, McClelland, Maier & Neustadt, L.L.P.

(57) ABSTRACT

A component made of micromachinable material for a high quality factor resonator or escapement mechanism, with a core made of micromachinable material and/or coated with an oxide layer, and including, on this core or on this oxide layer an abrasion resistant layer including a contact surface cooperating with an opposing contact surface an which is a hydrophobic self-assembled monolayer of the alkylsilane and/or fluorinated or perfluorinated or polyperfluorinated type, with a low or zero sulphur content, and arranged to repel any wetting agent from the area of contact between the contact surface and the opposing contact surface.

13 Claims, 3 Drawing Sheets

(56) References Cited

FOREIGN PATENT DOCUMENTS

| EP | 3 315 214 A1 | 5/2018 |
| EP | 3 327 515 A1 | 5/2018 |
| JP | 2006-283011 A | 10/2006 |
| JP | 2013-531258 A | 8/2013 |
| JP | 2019-536021 A | 12/2019 |
| WO | WO 2008/017721 A2 | 2/2008 |

OTHER PUBLICATIONS

Japanese Office Action dated Aug. 18, 2020 in Japanese Patent Application No. 2019-165894 (with English translation), Citing documents AO-AQ and AX therein, 12 pages.

Deng et al., "Performance Impact of Monolayer Coating of Polysilicon Micromotors", Journal of Electrochemical Society, Apr. 1995, vol. 142, No. 4, pp. 1278-1285.

European Search Report dated Mar. 20, 2019 in European Application 18195593.1, filed on Sep. 20, 2018 (with English Translation of Categories of Cited Documents & Written Opinion).

Zdol-TX:

Z-Tetraol:

COMPONENT MADE OF MICROMACHINABLE MATERIAL FOR HIGH QUALITY FACTOR RESONATORS

CROSS-REFERENCE TO RELATED APPLICATION

This application claims priority to European Patent Application No. 18195593.1 filed on Sep. 20, 2018, the entire disclosure of which is hereby incorporated herein by reference.

FIELD OF THE INVENTION

The invention concerns a component for a resonator with a high quality factor of more than 1000, or for a timepiece escapement mechanism arranged to cooperate with such a high quality factor resonator, said component having a core made of micromachinable material, coated with an oxide layer of said micromachinable material when said micromachinable material can oxidize, and said component including, on said core or on said oxide layer of said micromachinable material when said micromachinable material can oxidize, an abrasion resistant layer which includes at least one contact surface arranged to cooperate with an opposing contact surface comprised in at least one other component of said resonator or of said escapement mechanism or of a timepiece movement incorporating said resonator and/or said escapement mechanism.

The invention also concerns a resonator comprising at least one such component.

The invention also concerns an escapement mechanism comprising at least one such component.

The invention also concerns a timepiece movement including one such resonator and/or one such escapement mechanism.

The invention also concerns a watch comprising, in a sealed case, at least one such movement.

The invention concerns the field of timepieces, particularly watches, comprising high quality factor resonators, made with components made of micromachinable materials, and wherein the guide systems with elastic strips are arranged to provide good isochronism properties in all positions in the field of gravity.

BACKGROUND OF THE INVENTION

Most traditional mechanical watches are provided with a balance/balance spring oscillator and a Swiss lever escapement. The balance/balance spring forms the time base of the watch. It is also called a resonator. The escapement performs two main functions:
  maintaining the back-and-forth motions of the resonator;
  counting these back-and-forth motions.
In addition to these two main functions, the escapement must remain robust, resist shocks and avoid jamming the movement (overbanking).

The Swiss lever escapement, although very reliable, has low energy efficiency, of around 30%. This low efficiency is due to the fact that the movements of the escapement are jerky, there are 'drops' or runs to the banking to accommodate machining errors, and also because several components transmit their motion via inclined faces which rub against one another.

Making a mechanical resonator requires an inertia element, a guide member and an elastic return element. Conventionally, a balance spring acts as the elastic return element for the inertial element formed by a balance. The balance is guided in rotation by pivots which rotate in smooth ruby bearings. This produces friction, and therefore energy losses and errors of rate, which depend on the position of the watch in the field of gravity, and which it is sought to eliminate.

There are recently known mechanical resonators comprising an inertial element and at least two flexible elements which have the dual role of pivoting about a virtual pivot axis and of return spring. These new resonators allow higher oscillation frequencies, on the order of 10 Hz or 50 Hz or more, and much higher quality factors, for example on the order of 2000, than those of conventional mechanical resonators with a balance/balance spring, which are generally on the order of 280. The energy to be provided to the resonator at each vibration is thus much lower, for example 20 times lower, than that to be provided with a conventional balance/balance spring type resonator.

The energy passing through the escapement is therefore relatively much lower than that passing through a Swiss lever escapement in the case of a conventional resonator of the balance/balance spring type. This requires the development of escapement components with reduced inertia. This characteristic is achieved, on the one hand, by using low density materials, such as, for example, silicon or oxidized silicon, or the like, and on the other hand, by reducing the size of the escapement components. Silicon can advantageously be machined with technologies derived from electronics such as 'DRIE' or deep reactive ion etching, which allow precision suitable for the operating constraints of such an escapement. Silicon is oxidized naturally in air; it can also be deliberately oxidized during the manufacturing process, in order, for example, to increase the tenacity of components, or to change the coefficient of thermal expansion, or to create prestress for multistable components.

European Patent Application No. EP3327515A1 in the name of ETA Manufacture Horlogère Suisse discloses a rotating resonator with flexure bearings, whose oscillation is maintained by a detached lever escapement. The resonator, which has a quality factor Q, includes an inertial element comprising a pin cooperating with a fork of the pallets, subjected to the return force of two flexible strips secured to the plate, defining a virtual pivot about a main axis, the pallet lever pivoting about a secondary axis, and the angle of lift of the resonator, during which the pin is in contact with the fork, is less than 10°, and the ratio $I_B/I_A$ between the inertia $I_B$ of the inertial element with respect to the main axis, and the inertia $I_A$ with respect to the secondary axis is greater than $2Q \cdot \alpha^2/(0.1.\pi.\beta^2)$, where a is the angle of lift of the pallet lever corresponding to the maximum angular travel of the fork. More particularly, the pallet lever and/or the escape wheel set, and/or each flexible strip, is made of silicon, notably of oxidized silicon as regards the flexible strips.

WO Patent No. 2008/017721 in the name of SURFACTIS Technologies discloses a method of covering a metal or inorganic substrate by a molecular functionalization layer. This method includes the following successive steps: a) prior oxidation of the surface of the substrate if it is not already at least partially hydroxylated to arrange hydroxyl functions on the surface of the substrate, b) contact of the surface of the substrate with a liquid, gaseous or supercritical coating composition containing gem-bisphosphonic compounds and/or their toxicologically acceptable salts, until self-assembly of said gem-bisphosphonic compounds in a layer covering the surface, c) removal of the liquid, gaseous or supercritical coating composition, d) dehydration of the surface thus covered. It discloses the recovered substrate obtainable by this method, the uses of this functionalized substrate, the gem-bisphosphonic compounds allowing implementation of this coating method, and the uses of these gem-bisphosphonic compounds.

Silicon oxide (silica) is known for its propensity to adsorb water. This hygroscopic nature is also used to dry air in certain packaging to prevent damage to the merchandise contained therein from moisture, for example in the form of silica gel sachets.

In the case of mechanisms transmitting very low energy, adhesion problems may arise. These surface phenomena can become preponderant if the escapement components are of small size. Indeed, these surface effects (friction and adhesion) gradually become more significant than volume effects (inertia, mass) as the dimension of the parts decreases. The result is ultimately the potentially detrimental sticking together of parts.

Tests performed demonstrate a significant loss of efficiency when the relative humidity increases. The adhesion forces depend on the different surface tensions and the volume of liquid, and not on the force applied by one component or another.

Consequently, the effect of this sticking together of parts can cause the movement to stop, when the torque applied to the escapement is low and humidity is high. Disruptions and power reserve losses then ensue.

SUMMARY OF THE INVENTION

The invention proposes to make timepiece mechanisms with a high quality factor, in which the contact and detachment forces at the end of contact are insensitive to wetting agents, and especially to humidity.

To this end, the invention concerns a component for a resonator with a high quality factor, or for a timepiece escapement mechanism arranged to cooperate with such a high quality factor resonator, according to claim 1.

The invention also concerns a timepiece movement including such an escapement mechanism.

The invention also concerns a resonator comprising at least one such component.

The invention also concerns an escapement mechanism comprising at least one such component.

The invention also concerns a timepiece movement including one such resonator and/or one such escapement mechanism.

The invention also concerns a watch comprising, in a sealed case, at least one such movement.

BRIEF DESCRIPTION OF THE DRAWINGS

Other features and advantages of the invention will appear upon reading the following detailed description, with reference to the annexed drawings, in which.

DETAILED DESCRIPTION OF PREFERRED EMBODIMENTS

Figure 1:
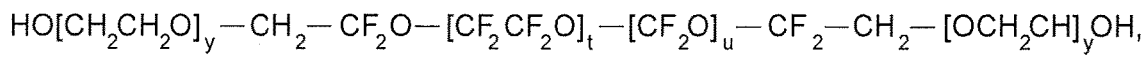
FIG. 1 represents two examples of the structure of polyperfluoroethers suitable for implementation of the invention: a Zdol-TX above and a Z-Tetraol below.
Figure 1:
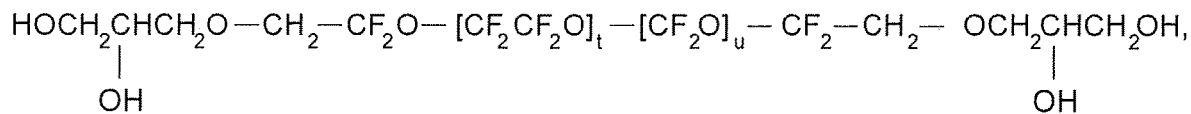

The invention is particularly intended to prevent adhesion phenomena in a timepiece mechanism comprising a high quality factor resonator, notably higher than 1000, comprising guiding means with a virtual pivot, or with a flexure bearing, or similar, and wherein the transferred energy is much lower than in a mechanism, referred to below as a conventional mechanism, with a resonator of the balance/balance spring type and Swiss lever escapement, and wherein contact forces are logically very reduced.

The technical problem is to overcome capillary forces as two opposing components are detached, when the mechanism tends to separate these two opposing components: although capillary forces are negligible compared to the other forces in a conventional mechanism, this is no longer the case in a mechanism with a high quality factor resonator, and capillary stress hinders the detachment of the components.

The invention proposes to use a hydrophobic coating in order to limit the effect of capillary forces in such a mechanism. The surface tension of a liquid is given in N/m but can also be given in J/m2. Thus, the larger the surface that a liquid wets, the more energy must be provided to separate it from another surface in contact therewith. The operation of the escapement involves the detachment of many components, and, each time, energy is used because of these capillary forces.

In particular, the silicon components, widely used in such high quality factor resonators, have on their surface a natural or non-natural oxide, which is hygroscopic. A wetting agent, such as water (moisture in the air), or another liquid, such as a lubricant, or solvent, present in the watch case, is deposited over the entire surface of the parts concerned in an ambient environment, thereby impairing the working of the mechanism. A coating preventing water or another liquid from wetting these functional surfaces can correct the problem.

It is, of course, possible to envisage operation without a lubricant. In such case, ambient moisture is prevented from wetting the surface of the treated parts. However, it is also possible to envisage operation with the presence of a wetting agent, such as oil, grease, solvent or water, depending on the nature of the various mechanisms incorporated in the watch case. The objective of the hydrophobic coating is, in that case, to limit the surface wetted by this wetting agent.

The invention makes it possible, in particular, to limit the loss of efficiency when the relative humidity increases.

Placing a hydrophobic coating on the contact surfaces of the mechanisms combined with the addition of higher than normal roughness limits the actual contact surface, and therefore also limits the energy dissipated during detachment of the parts. However, this roughness cannot be increased heedlessly, due to friction, operating time, and therefore wear.

The invention ensures protection against the presence of a wetting agent on the contact surfaces of a timepiece mechanism component made of micromachinable material, and more particularly protection against the presence of a wetting agent on the contact surfaces of a component of a high quality factor resonator, or of a component of an escapement mechanism arranged to cooperate with such a high quality factor resonator.

The invention consists in the implementation of a method consisting in the deposition of a hydrophobic coating on the surface of at least one timepiece component made of micromachinable material having a propensity to absorb water, and in particular on the surface of the contact areas of components inside mechanisms, particularly components of a resonator and/or an escapement mechanism.

More particularly, the invention concerns the protection of a stopping mechanism, particularly a pallet fork, and components with which this stopping mechanism is arranged to cooperate: the escape wheel set, particularly the escape wheel and inertial mass of the resonator. When one of these components comprises several basic parts, the invention thus concerns the protection of the contact surfaces of these basic parts, for example of two-part pallets.

A 'component made of micromachinable material' means a component made of silicon, or oxidized silicon, or any similar hydrophilic material, having a propensity to absorb water, and in particular on the surface of the escapement mechanism components. In general, the term 'component made of micromachinable material' means any timepiece component made using one of the 'M EMS' (microelectromechanical systems), LIGA (Röntgenlithographie, Galvanoformung, Abformung or Lithography, Electroplating and Moulding) or similar technologies, used to make one-piece, very high precision timepiece components at an acceptable production cost.

Due to the operating constraints of timepiece mechanisms, and more particularly of a resonator or escapement mechanism, this hydrophobic coating must be resistant to abrasion, in order to ensure long-term operation.

This hydrophobic coating must be particularly carefully adhered to the surface. Thus, the surface must be free of any contamination prior to the deposition. This deposition is preferably of the self-assembled monolayer type, also referred to hereinafter as 'SAM'. These coatings are known in other industrial fields but only for their lipophobic properties and to protect areas that must not be contaminated by lubricant; they are not used for their hydrophobic properties for silicon or similar components.

The surfaces must be perfectly clean to ensure robustness and durability. This can be achieved by performing the grafting treatment after the DRIE etch or similar in the same clean room or by efficient cleaning of the parts. Different types of cleaning can be performed: nitrogen jet dust removal, deionized water cleaning, solvent cleaning (optic/clear, acetone, isopropyl alcohol), silicon deoxidation (HF/$H_2O$), 'piranha' solution cleaning ($H_2SO_4/H_2O_2$) to remove mask residues or the like. Following these processes: it is also possible to use transistor manufacturing cleaning standards, and known for cleaning wafers, such as the RCA clean standard, developed by W. Kern for 'RCA Radio Corporation of America', consisting of a chemical method in successive steps: removal of organic contaminants ($H_2O/NH_4OH/H_2O_2$), removal of thin oxide layers ($HF/H_2O$), and ionic cleaning ($H_2O/HCl/H_2O_2$), then rinsing and drying. The choice is made according to the contamination to be removed from the surface and the means available.

The hydrophobic coating includes at least one type of functionalization molecule.

The hydrophobic coating can be a lubricant, able to grafted to the surface, such as a perfluoropolyether lubricant, of the type used to lubricate the contact between the read head and disc of a computer hard-disc system, known by the trade references 'Z-dol', 'Z-Tetraol', or 'Solvay Fomblin'.

Other families of products intended to make the surface hydrophobic are advantageously alkylsilanes, such as dichlorodimethylsilane (DDMS), perfluorodecyltrichlorosilane (FDTS) or preferably octadecyltrichlorosilane (ODTS or OTS) $CH_3(CH_2)_{17}SiCl_3$.

In the case of the SAM lubricant, the polyperfluorethers are also called perfluoropolyalkylethers. U.S. Pat. No. 7,510,999B2 in the name of DENG/HITACHI describes some of them, in their application to the lubrication of magnetic recording means.

FIG. 1 gives an example of the structure of such a polyperfluorether.

Surface preparation consists in adjusting the roughness of the component, the minimum thickness of any oxide surface layer, notably of the $SiO_2$ layer in the case of a silicon component, and any special preparation. The roughness may remain that resulting from the DRIE etch operation. It is now possible to have nanometric roughness and micrometric roughness, depending on the type of post-treatment chosen. In any event, the deposition is of nanometric thickness and is conformal with the surface by matching its topography. In the particular case of silicon, the thickness of the $SiO_2$ is not of fundamental importance for the desired application, given that an atomic oxide layer is sufficient. In open air, hydroxyl OH bonds are formed, which the SAM will use for grafting, for example by means of its own hydroxyl OH bonds. In any event, the $SiO_2$ thickness can vary between 0.1 nm (natural oxidation) and, for example, 10 µm (forced oxidation), according to horological needs. For an application to an escapement mechanism, the $SiO_2$ oxide layer used with a thickness of around 500 nm provides good adhesion and satisfactory results.

The application of the hydrophobic coating includes an operation of 'grafting" to the surface. This grafting mechanism is briefly explained below and is based on the OH bonds.

In short, the surface has an affinity with part of the molecule to be deposited. This is known as 'head'. Generally, the oxygen present at the surface is used, which will have reacted with moisture in the air to form hydroxyl (OH) groups. Since the molecule to be deposited includes a group having an affinity with these OH groups, it will spontaneously chemically bond thereto. This is known as adsorption. The molecules are generally organised in space according to their morphology (usual representation of surfaces on which there are molecular hairs).

Figure 2:
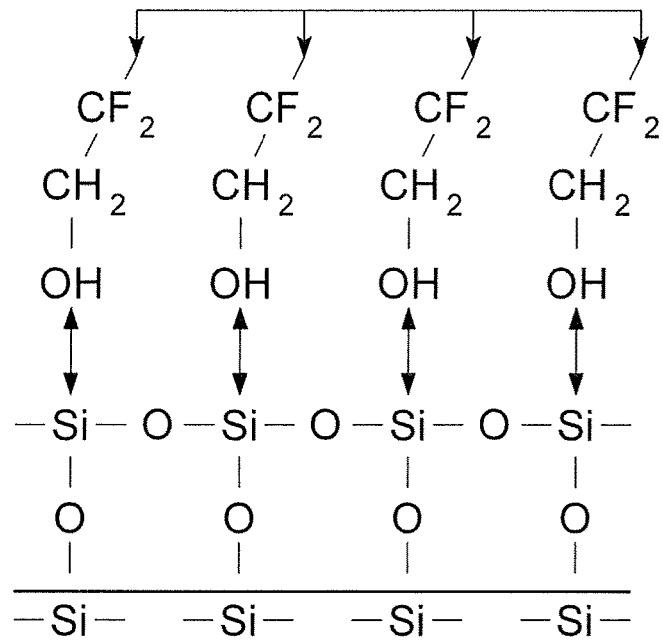
FIG. 2 shows a silicon structure whose surface is represented by a solid horizontal line; its oxide $SiO_2$ extends therebeyond. The OH bond of the molecule to be deposited (in this case a self-assembled monolayer or SAM said lubricant) is bonded to the silicon atom in replacement of the same OH bond which developed on the $SiO_2$ in the ambient air.

FIG. 2 shows a silicon structure, whose surface is represented by a solid horizontal line, beyond which its oxide $SiO_2$ extends. The OH bond of the molecule to be deposited (in this case a SAM lubricant) is bonded to the silicon atom in replacement of the same OH bond which developed on the $SiO_2$ in the ambient air.

Figure 3:
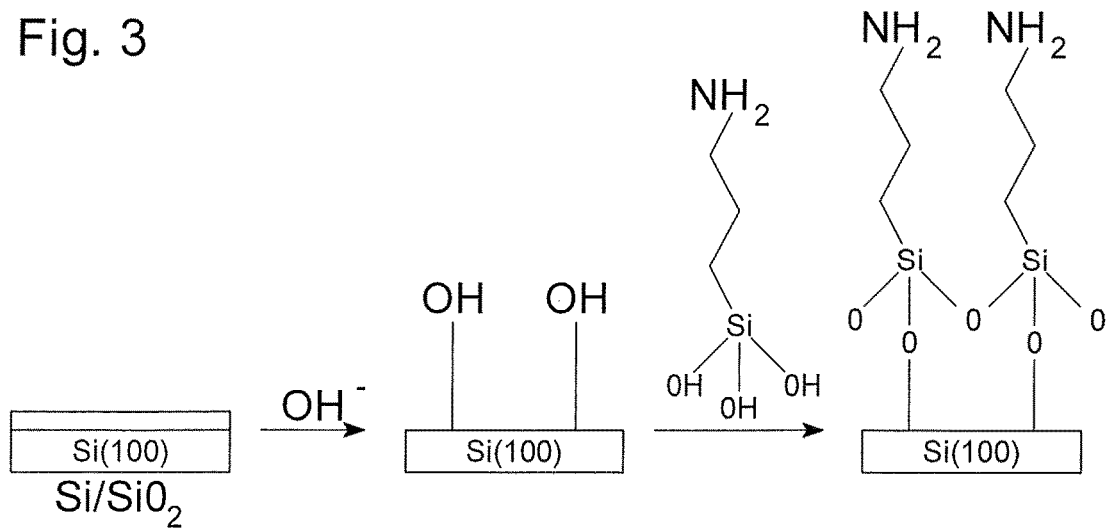
FIG. 3 illustrates the formation of OH groups in a hydroxylation phase on the $Si/SiO_2$ surface, on which a molecule with a silane head will be grafted during a subsequent silanization phase, the rest of the $NH_2$ molecule is given as an example.
Figure 4:
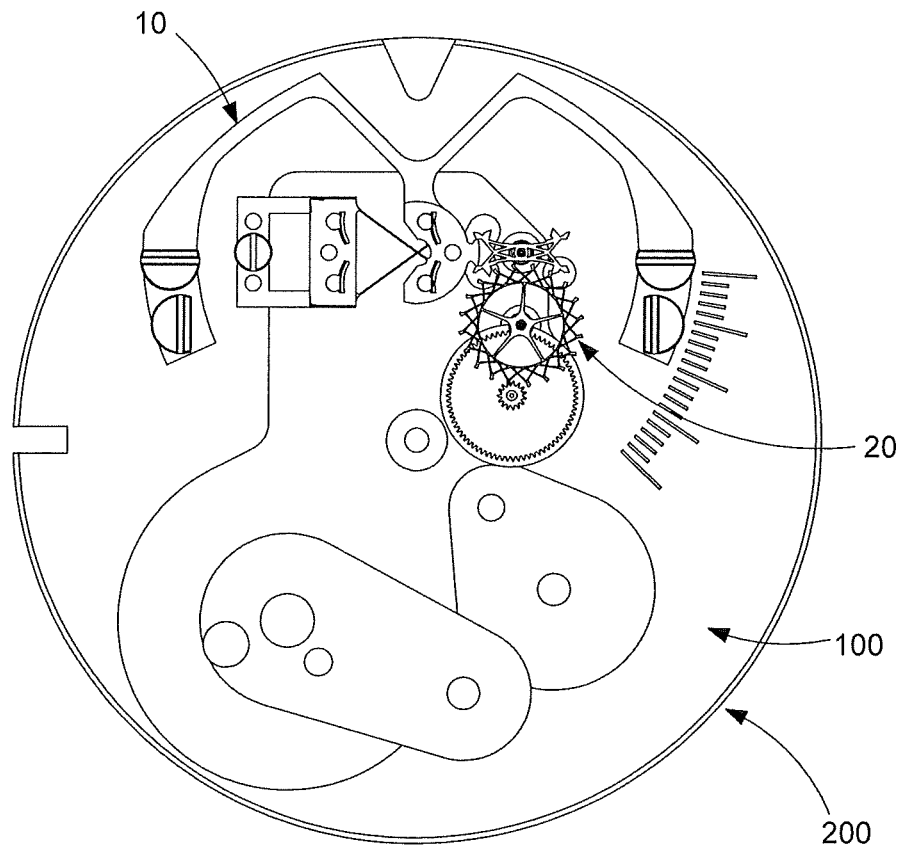
FIG. 4 represents a schematic plan view of a watch with a movement comprising a high quality factor resonator, and a suitable escapement mechanism, whose components are made according to the invention.
Figure 5:
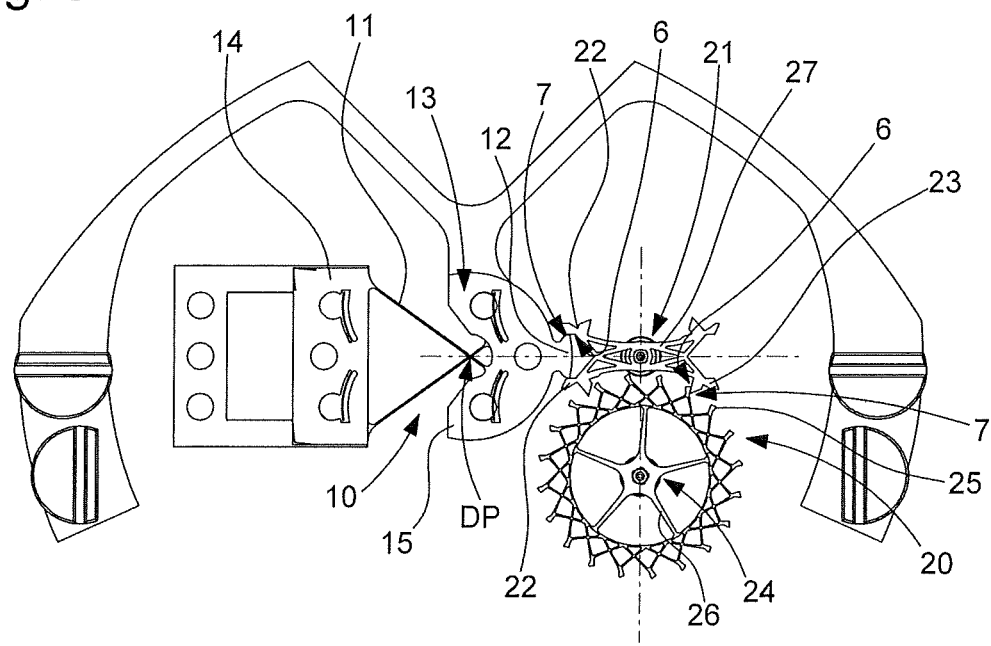
FIG. 5 is a detail of FIG. 4.
Figure 6:
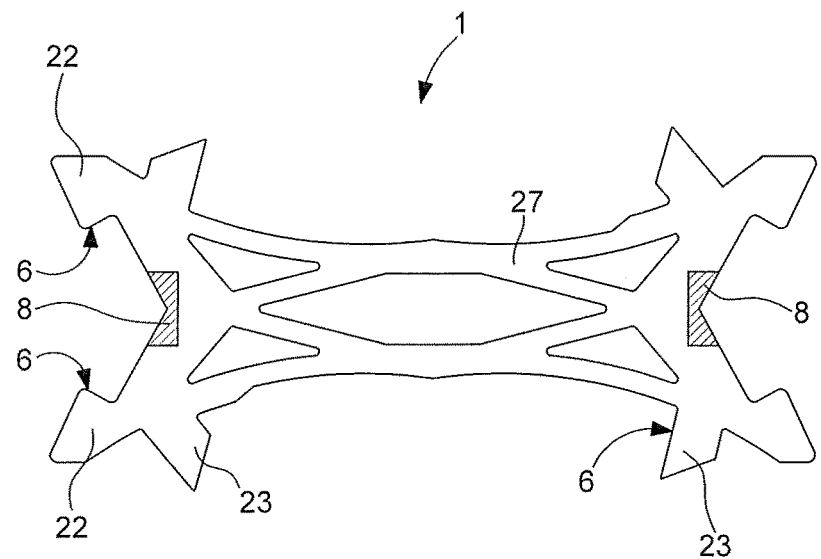
FIG. 6 is a detail of the pallet lever of the mechanism of FIGS. 5 and 6, forming the link between the resonator and the escape wheel.
Figure 7:
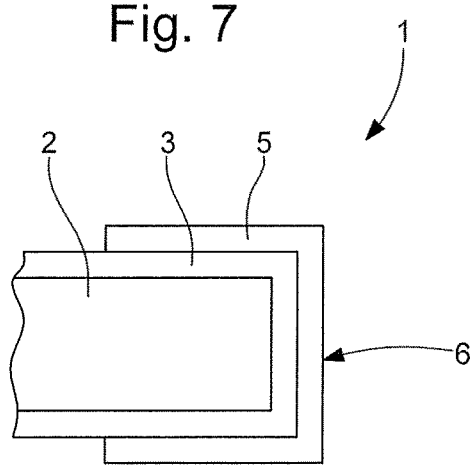
FIG. 7 is a sectional diagram of a component according to the invention with a hydrophobic abrasion resistant layer, whose surface layer is a hydrophobic contact surface.
Figure 8:
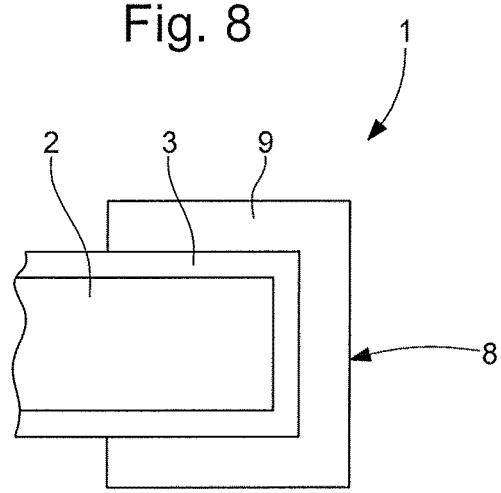
FIG. 8 is a sectional diagram of a component according to the invention with a hydrophilic abrasion resistant layer, whose surface is a condensate collection surface.
Figure 9:
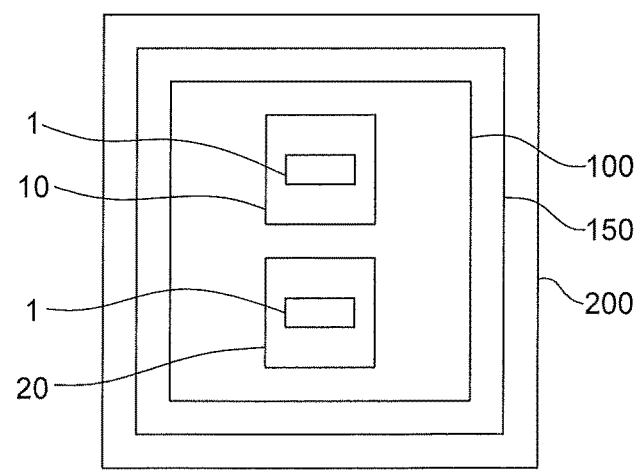
FIG. 9 is a block diagram representing a watch whose case contains a movement with a resonator and an escapement mechanism both comprising the components according to the invention.

FIG. 3 illustrates the formation of OH groups on the surface of the $Si/SiO_2$ on which a molecule with a silane head will be grafted. The rest of the $NH_2$ molecule is given as an example. Generally, fluorine atoms are used to reduce surface tensions.

It is also possible to have molecules with heads of the silane group type: ODTS, FDTS and DDMS. The latter have a natural affinity with the $Si/SiO_2$ wafer, which makes them easier to graft.

Another alternative consists in using heads of the bis- or mono-phosphonic acid and/or thiol groups and a combination of the three (usually two).

The hydrophobic coating is generally applied by dipping It therefore covers the entire surface that the mixture can wet. Generally, the active molecule is dissolved in a solvent which is specific thereto (alcohol or water are both common solvents). Its concentration is broadly sufficient for the entire surface to be coated in a generally short time. Molecules deposited, but not grafted to the surface, can be removed during a rinsing operation in another bath of the same solvent (but without active molecules). This bath cannot remove the grafted molecules since they are now chemically bonded to the surface.

Alternatively, a selective deposition on only one of the active areas of the component is possible, but requires, prior to the SAM deposition, another deposition which can be removed without removing the SAM, which makes the method more complicated and more expensive to implement, especially since the hydrophobic coating has no negative effect when it covers the non-active surfaces.

The hydrophobic coating can be deposited, as above, by dipping, but also by gaseous means, for example by a CVD process.

Thus, more particularly, the invention concerns a component 1 for a resonator 10 with a high quality factor of more than 1000, or for a timepiece escapement 20 mechanism arranged to cooperate with such a resonator 10 with a high quality factor of more than 1000.

This component 1 has a core 2 made of micromachinable material, coated with an oxide layer 3 of the micromachinable material when said micromachinable material can oxidize.

Component 1 includes, on this core 2 or on this oxide layer 3 of the micromachinable material when said micromachinable material can oxidize, an abrasion resistant layer 5, which includes at least one contact surface 6.

This contact surface 5 is arranged to cooperate with an opposing contact surface 7, comprised in at least one other component of resonator 10, or of escapement mechanism 20, or of a timepiece movement 100 incorporating this resonator 10 and/or this escapement mechanism 20.

More particularly, all the contact surfaces 6 of the same mechanism are of the same nature, and all the opposing surfaces 7 with which these contact surfaces 6 cooperate are of the same nature as these contact surfaces 6.

According to the invention, this abrasion resistant layer 5 is a hydrophobic self-assembled monolayer of the silane and/or fluorinated or perfluorinated or polyperfluorinated type.

In a variant, the hydrophobic self-assembled monolayer contains sulphur, such as for example in the case of use of a thiol.

In another variant, the sulphur content in the hydrophobic self-assembled monolayer is zero.

According to the invention, this hydrophobic self-assembled monolayer is arranged to repel any wetting agent from the area of contact between contact surface 6 and an opposing contact surface 7, in order to facilitate the detachment between contact surface 6 and an opposing contact surface 7 when the operation of resonator 10 or of escapement mechanism 20 separates contact surface 6 and opposing contact surface 7.

Advantageously, abrasion resistant layer 5 has a roughness greater than or equal to 5 nanometres Ra and more particularly greater than or equal to 9 nanometres Ra, more particularly still greater than or equal to 25 nanometres Ra, at least on at least one contact surface 6. More particularly, abrasion resistant layer 5 has a roughness greater than or equal to 5 Ra on each contact surface 6. One of the two contact surfaces must be smooth in order to avoid excessive friction (interpenetration of roughness, for example). The rough surface must be in motion relative to a smooth surface in order to avoid wear. The surface of the opposing part must preferably be small to limit wear, and its roughness is advantageously lower than that of the contact surface, and more particularly but not exclusively lower than 5 nanometres Ra.

The invention thus makes it possible to move any wetting agent away from the contact area. Since a watch case 150 is sealed, it is advantageous to be able to control the localization of the wetting agents that it contains, including condensation during temperature changes. To this end, in an advantageous arrangement, component 1 includes, remote from every said contact surface 6 and every said opposing contact surface 7, at least one condensate collection surface 8 on the surface of a hydrophilic layer 9 arranged on core 2 or on oxide layer 3 of the micromachinable material when the micromachinable material can oxidize, or arranged locally on abrasion resistant layer 5, to form a trap to attract any wetting agent or aqueous condensate or lubricant and move it away from contact surfaces 6 and opposing contact surfaces 7. Thus, the wetting agents are not only repelled from the contact areas, but also attracted to areas where they are not harmful.

Advantageously, condensate collection surface 8 is located in a solid area: area 14 for attachment to a plate or a bridge, inertial weight 15 of an inertia wheel set 13, arm 26 of an escape wheel 24, body 27 of a pallet fork 21, and remote from pins 12, teeth 25 or other contact pallets 22, 23.

In an advantageous embodiment on $SiO_2$, the hydrophobic self-assembled monolayer contains octadecyltrichlorosilane $CH_3CH_{21}SiCl_3$.

More particularly, component 1 is a component of resonator 10 and comprises at least one straight or spiral flexible strip 11, which is arranged to form a return means for resonator 10 and whose surface is that of core 2 or of oxide layer 3 of the micromachinable material when the micromachinable material can oxidize.

The invention also concerns a resonator 10 comprising at least one such component 1, and whose opposing surfaces 7 are of the same nature as contact surfaces 6.

The invention also concerns an escapement mechanism 20 comprising at least one such component 1, and whose opposing surfaces 7 are of the same nature as contact surfaces 6.

The invention also concerns a timepiece movement 100 comprising one such resonator 10 and/or one such escapement mechanism 20 and whose opposing surfaces 7 are of the same nature as contact surfaces 6.

The invention also concerns a watch 200 including, inside a sealed case 150, one such movement 100.

As regards compatibility with conventional watch lubricants, it should first be emphasised that it is sought to prevent contact between the head of the molecule and any lubricant, because the lubricant intrinsically generates capillary type adhesion forces; this molecule head is often formed of the same type of molecules, generally fluorinated, like those of known epilames currently used in horology, and consequently there is no issue of compatibility in case of contact with state of the art watch lubricants. In the case of SAM molecules of the ODTS type, particularly fluorine-free alkylsilanes, the head of the molecule is of the aliphatic type, which also raises no issue of compatibility with state of the art watch lubricants.

The use of certain SAM self-assembled monolayer depositions is known only for the purpose of lowering surface tension, to keep a watch lubricant in the location of a contact to be lubricated, which is free of SAM. The lubricant must therefore remain in the contact area to dissipate, through its viscosity amongst other things, the shear forces of the two bodies in contact and in relative motion, and to reduce contact pressure. The lubricant thus decreases the friction coefficient.

The present invention is fundamentally different, in the sense that the opposite is sought, that is to say that it is sought to prevent a wetting agent, or a liquid, of whatever type, being found in a contact, because in systems where there is little energy, the adhesion forces (capillary) become predominant. Indeed, the surface forces (adhesion) become, for small, low energy mechanisms, greater than the volume forces (inertia, weight). These capillary forces are proportional to the surface tension of the liquids concerned, the volume of liquid and the way in which the volume is distributed. They are not proportional either to the contact pressure or to the relative speed between the bodies, unlike friction forces.

The invention claimed is:

1. A component for a resonator with a high quality factor of more than 1000, or for a timepiece escapement mechanism configured to cooperate with the resonator, said component comprising:
    a core made of micromachinable material, coated with an oxide layer of said micromachinable material where said micromachinable material can oxidize, and
    on said core or on said oxide layer of said micromachinable material where said micromachinable material can oxidize, an abrasion resistant layer that includes a contact surface arranged to cooperate with an opposing contact surface comprised in a counterpart component of said resonator or of said escapement mechanism or of a timepiece movement incorporating said resonator and/or said escapement mechanism,
    wherein said abrasion resistant layer is a hydrophobic self-assembled monolayer of a silane and/or a fluorinated or perfluorinated or a polyperfluorinated type,
    wherein said hydrophobic self-assembled monolayer is arranged to repel a wetting agent from a contact area between said contact surface and said opposing contact surface, to facilitate detachment between said contact surface and the opposing contact surface when an operation of said resonator or of said escapement mechanism separates said contact surface and said opposing contact surface, and
    wherein said abrasion resistant layer has a roughness greater than or equal to 5 nanometers Ra at least on said contact surface.

2. The component according to claim 1, wherein said abrasion resistant layer has a roughness greater than or equal to 5 nanometers Ra on the contact surface.

3. The component according to claim 1, wherein the opposing surface of the counterpart component, with which said abrasion resistant layer cooperates, has a lower roughness than that of said abrasion resistant layer.

4. The component according to claim 3, wherein the opposing surface of the counterpart component, with which said abrasion resistant layer cooperates, has a roughness lower than 5 nanometers Ra.

5. The component according to claim 1, wherein said component further comprises
    remote from the contact surface and from the opposing contact surface, at least one condensate collection surface on a surface of a hydrophilic layer arranged on said core or on said oxide layer of said micromachinable material where said micromachinable material can oxidize, or arranged on said abrasion resistant layer, to form a trap to attract the wetting agent or aqueous condensate or lubricant and move the wetting agent, the aqueous condensate, or the lubricant away from the contact surface and the opposing contact surface.

6. The component according to claim 1, wherein said hydrophobic self-assembled monolayer includes an alkyltrichlorosilane.

7. The component according to claim 6, wherein said hydrophobic self-assembled monolayer includes octadecyltrichlorosilane $CH_3(CH_2)_{17}SiCl_3$.

8. The component according to claim 1, wherein a sulphur content of said hydrophobic self-assembled monolayer is zero.

9. The component according to claim 1, wherein said component is a resonator component and further comprises at least one straight or spiral flexible strip arranged to form a return means for the resonator, and whose surface is that of said core or of said oxide layer of said micromachinable material where said micromachinable material can oxidize.

10. A resonator comprising at least one component according to claim 1, wherein the opposing contact surface is of a same type as said contact surface.

11. An escapement mechanism comprising at least one component according to claim 1, wherein the opposing contact surface is of a same type as said contact surface.

12. A timepiece movement comprising the resonator according to claim 10, wherein the opposing contact surface is of a same type as said contact surface.

13. A watch comprising, in a sealed case, at least one timepiece movement comprising the resonator according to claim 10, wherein the opposing contact surface is of a same type as said contact surface.

* * * * *